Feb. 22, 1944.　　　A. WIKSTROM　　　2,342,317
LOCK NUT
Filed May 26, 1943

Inventor:
Agnar Wikstrom
by Emery, Booth, Townsend, Miller & Widner
Attys

Patented Feb. 22, 1944

2,342,317

UNITED STATES PATENT OFFICE 2,342,317

LOCK NUT

Agnar Wikstrom, Boston, Mass.

Application May 26, 1943, Serial No. 488,505

4 Claims. (Cl. 151—7)

This invention relates to lock nuts of the type wherein a sleeve of relatively soft material is carried by the nut in alignment with the threaded opening therein, into which sleeve the male threads of the bolt force their way when the parts are assembled to provide a tight resilient grip on the threads resisting loosening of the connection. Such a type of lock nut is disclosed in the patent to Rennerfelt 1,550,282. The object of the invention is to provide a simple and effective construction whereby the sleeve is firmly and non-rotably held to the nut proper and so supported as to provide for an effective and uniform pressure on the male threads throughout the length engaged.

My invention will be well understood by reference to the following description taken in connection with the accompanying drawing, wherein—

Figure 1:
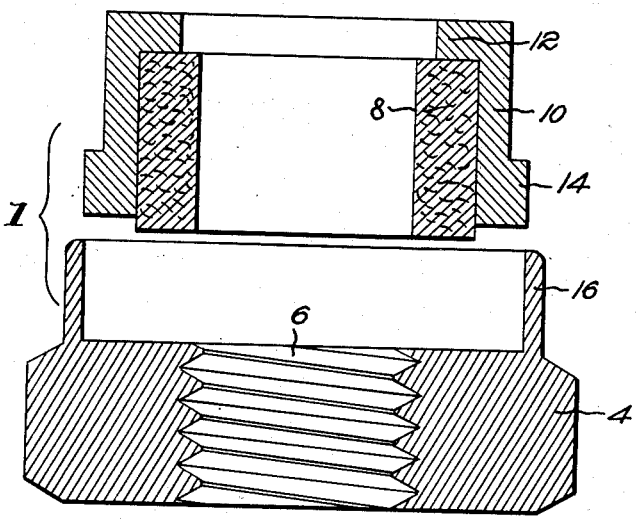
Fig. 1 is a central vertical section showing various component parts of the lock nut as they would appear prior to assembly.
Figure 2:
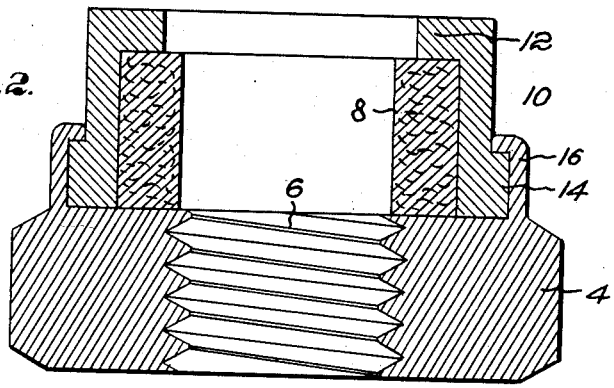
Fig. 2 is a central verticle section through the completed lock nut.
Figure 3:
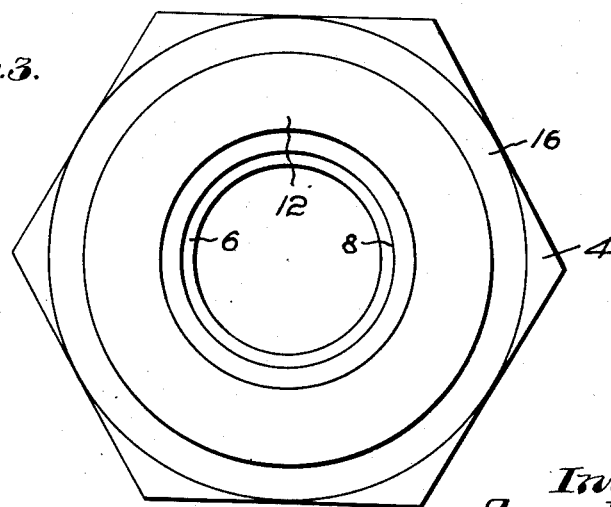
Fig. 3 is a plan viewing the distal face of the nut.

In applying these nuts to a bolt the latter is usually threaded through the metal nut proper and then cuts its way through the sleeve, the sleeve being disposed on the side away from the head of the bolt, assuming that a headed bolt is in question. For convenience in the following description I shall refer to that side as the distal side and the side which would then be nearer the head as the proximal side.

Referring to the drawing, the lock nut there shown comprises the nut body proper 4 of any convenient form and having the threaded opening 6 to receive the member having the male thread. With this opening 6 is aligned the central opening of the relatively soft sleeve 8 of so-called hard fiber or the like, the opening in the sleeve being smaller than the outer diameter of the bolt threads so that the latter will cut or force their way through the sleeve when the parts are assembled.

The member 8 is preferably a short section of preformed cylindrical tube as shown. It is carried by and secured to the bolt by a pre-formed metal member having a cylindrical wall 10 to embrace and support the sleeve exteriorly and in which the sleeve fits tightly with a driving or force fit. The distal end of the wall 10 is provided with an inwardly turned flange 12 against which the end of the sleeve fits and the member thus takes the form of a cup perforated at the bottom.

As best seen in Fig. 1, the sleeve 8 is preferably somewhat longer than the cylindrical wall 10 which embraces it and in its normal unstressed condition when seated against the flange 12 projects outwardly at the proximate end of the carrying member a short distance, say from five to ten thousandths of an inch. The mounted sleeve is secured to the distal face of the nut 6 in such a manner as to compress the surplus length of the sleeve within the cup, axially compressing the same so that it is firmly and non-rotatably held at the distal side of the nut body proper 4. Herein the cup is proveded at its proximal end with a flange 14 adapted to fit within an annular rib 16 projecting at the distal face of the nut body 4 and which is upset or riveted over inwardly on the flange 14, thus drawing the parts together until the flange 14 is firmly seated on the distal face of the nut body 4 while the sleeve 8 is compressed and strongly gripped between that face and the flange 12.

The pre-formed sleeve of simple cylindrical form is firmly and non-rotatably associated with the nut, it is not substantially distorted in shape by the compression above referred to, and it is firmly supported throughout its exterior circumference so that the male threads of the bolt in forcing their way therethrough encounter a uniform resistance, resulting in the formation of a tight-gripping thread which exerts uniform pressure throughout the length of the parts engaged. The accuracy of the female thread thus cut is such that a nut may be unscrewed and re-used for a reasonable number of times without impairing the firmness of the lock.

I claim:

1. A lock nut of the type wherein a sleeve of relatively soft material is carried by the nut in alignment with the threaded opening therein to be cut into by the male threads, comprising the nut proper, the sleeve, a separate member having a cylindrical wall embracing and supporting the sleeve, the wall being slightly shorter than the axial length of the sleeve, the wall having an inwardly extending flange at its distal end and an outwardly extending flange at its proximal end, the distal face of the nut having a rib upset on the latter flange to hold it against said face and secure the sleeve under axial compression against the same.

2. A lock nut of the type wherein a sleeve of relatively soft material is carried by the nut in alignment with the threaded opening therein to be cut into by the male threads, comprising the nut proper, the sleeve and a separate member having a cylindrical wall embracing and supporting the sleeve, the wall being slightly shorter than the axial length of the sleeve, the wall having an inwardly extending flange at its distal end to overlie the distal end of the sleeve, the proximal end of the member being secured at the distal side of the nut and said member axially compressing the sleeve between said flange and the distal face of the nut.

3. A lock nut of the type wherein a sleeve of relatively soft material is carried by the nut in alignment with the threaded opening therein to be cut into by the male threads, comprising the nut proper, the sleeve and a pre-formed member in the form of a cup having a perforated bottom against which the distal end of the sleeve bears and an annular side wall receiving and supporting the periphery of the sleeve, the cup being slightly shallower than the normal depth of the sleeve, the rim of the cup being clinched to the distal face of the nut and compressing the sleeve between said face and the bottom of the cup.

4. A lock nut of the type wherein a sleeve of relatively soft material is carried by the nut in alignment with the threaded opening therein to be cut into by the male threads, comprising the nut proper, the sleeve, a separate member having a cylindrical wall embracing and supporting the sleeve, the wall being slightly shorter than the axial length of the sleeve, the wall having an inwardly extending flange at its distal end to overlie the distal end of the sleeve, and means interlocking the proximal end of said member with the distal face of the nut and providing for axial compression of the sleeve between said face and said flange.

AGNAR WIKSTROM.